US 6,557,543 B2

(12) United States Patent
Cole et al.

(10) Patent No.: US 6,557,543 B2
(45) Date of Patent: May 6, 2003

(54) HIGH PRESSURE AIRFLOW AND DUCT DISTRIBUTION SYSTEM FOR A CONVECTION OVEN

(75) Inventors: James T. Cole, Algonquin, IL (US); Donald E. Fritzsche, Chicago Heights, IL (US); David W. Harter, New Port Richey, FL (US); Ronald Jay Forni, Littleton, MA (US); Malcolm Reay, Drums, PA (US); Jerry Sank, Palm Harbor, FL (US); David McFadden, Lexington, MA (US); Douglas S. Jones, New Port Richey, FL (US)

(73) Assignee: Gas Research Institute, Des Plaines, IL (US)

( * ) Notice: Subject to any disclaimer, the term of this patent is extended or adjusted under 35 U.S.C. 154(b) by 0 days.

(21) Appl. No.: 09/893,310

(22) Filed: Jun. 27, 2001

(65) Prior Publication Data
US 2003/0000514 A1 Jan. 2, 2003

(51) Int. Cl.[7] ................................................. A21B 1/08
(52) U.S. Cl. ................... 126/21 A; 126/21 R; 126/19 R
(58) Field of Search ............................ 126/21 A, 21 R, 126/19 R, 273 R; 219/400

(56) References Cited

U.S. PATENT DOCUMENTS

| 4,395,233 A | * | 7/1983 | Smith et al. ............... 126/21 A |
| 4,516,012 A | * | 5/1985 | Smith et al. ............... 126/21 A |
| 4,556,043 A | * | 12/1985 | Bratton ..................... 126/21 A |
| 4,679,542 A | * | 7/1987 | Smith et al. ............... 126/21 A |
| 4,779,604 A | | 10/1988 | König |
| 5,080,087 A | * | 1/1992 | McFadden et al. ........... 126/20 |
| 5,231,920 A | * | 8/1993 | Alden et al. ............... 126/21 A |
| 5,845,631 A | * | 12/1998 | Kleva et al. ............... 126/21 A |
| 6,131,559 A | * | 10/2000 | Norris et al. .............. 126/21 A |
| 6,227,189 B1 | * | 5/2001 | Dougherty ................. 126/15 A |

* cited by examiner

Primary Examiner—Henry Bennett
Assistant Examiner—Alfred Basichas
(74) Attorney, Agent, or Firm—Mark E. Fejer

(57) ABSTRACT

A convection oven having a high pressure duct distribution system to produce airflow within a cooking chamber of the convection oven. The high pressure airflow is easily tuned to produce a precise airflow pattern within the cooking chamber by opening and/or closing individual nozzles which extend from a duct of the duct distribution system into the cooling chamber.

19 Claims, 4 Drawing Sheets

HIGH PRESSURE AIRFLOW AND DUCT DISTRIBUTION SYSTEM FOR A CONVECTION OVEN

BACKGROUND OF THE INVENTION

1. Field of the Invention

This invention relates to a commercial convection oven having an easily tuneable high pressure airflow pattern. The convection oven has a duct with nozzles that extend into a cooking chamber. Each nozzle is positionable between an open position and a closed position in order to tune the airflow pattern within the cooking chamber while maintaining a desired static pressure within the duct.

2. Description of the Related Art

Conventional commercial convection ovens have one or more fans which circulate the air within the oven cavity. The airflow within the oven cavity is highly turbulent but characterized by a circulation pattern evident in the oven's baking performance. A distinct and often undesirable pattern is seen on the cooked food product. In areas of the oven cavity where the airflow is too low, the food product will be raw or uncooked. Conversely, in areas where the airflow is too high, the food product will be burned or overcooked. In such situations, it is desirable to tune the convection oven so that a uniform airflow is obtained.

Many conventional commercial convection ovens having low pressure systems are tuned by attempting to produce a single flow pattern having a uniform flow and temperature distribution within the oven cavity. However, the tuning of conventional convection ovens is difficult, and often a trial and error process, for several reasons. First, convection ovens are used to cook different types and quantities of food products having a variety of sizes, shapes and cooking requirements. Second, the airflow pattern within the oven cavity is highly unpredictable because the energy is stored in the form of velocity rather than pressure. Third, air may not flow through the oven cavity in a uniform pattern depending on the direction and magnitude of the surrounding flow. Accurately tuning a conventional convection oven with a low pressure system is extremely difficult for these reasons.

It is apparent that there is a need for a convection oven with a tuneable airflow pattern within the oven cavity to provide a uniform airflow pattern for an even cooking process.

It is also apparent that there is a need for a convection oven wherein the energy is stored in the form of pressure rather than velocity to provide a predictable airflow pattern.

SUMMARY OF THE INVENTION

It is an object of this invention to provide a duct distribution system to produce a high pressure airflow within a cooking chamber of a convection oven.

It is another object of this invention to provide a high pressure airflow that is easily tuneable to a predictable direction and defined pattern to provide a uniform airflow within a cooking chamber.

The above objects and other objects of this invention are accomplished with a duct distribution system for a convection oven having a blower plenum, positioned adjacent and in communication with a cooking chamber, and a duct. In preferred embodiments of this invention, a high pressure convection blower produces a high pressure airflow at about 800 cubic feet per minute ("cfm") at about 2 inches to about 3 inches of static pressure. For other convection ovens having a cooking chamber with a different volume, the high pressure airflow may vary accordingly. For example, the high pressure airflow may range from about 400 cfm to about 1600 cfm.

The duct is connected to the blower plenum and in communication with the cooking chamber. In the preferred embodiments of this invention, the duct extends along at least a portion of the outer back wall and/or a side wall of the convection oven. Preferably, at least a portion of the duct has a plurality of nozzles extending into the cooking chamber. Each nozzle is moveable between an open position and a closed position to tune the airflow pattern within the cooking chamber. In other preferred embodiments of this invention, a plurality of apertures, for example slots, are positioned on at least a portion of the duct.

Preferably, the static pressure within the duct is at least 0.5 inch $H_2O$ or at least about 250%, preferably at least about 300% of a theoretical dynamic pressure. The relatively high level of static pressure in the duct allows the airflow though the nozzles into the cooking chamber to be precisely tuned to a definite airflow pattern. Tuning the airflow according to this invention involves closing the nozzles in areas where the airflow into the cooking chamber is too high, and opening the nozzles in areas where the airflow into the cooking chamber is too low.

In one preferred embodiment of this invention, an inlet baffle is positioned between the cooking chamber and the blower plenum. The inlet baffle has a plurality of apertures to provide communication between the cooking chamber and the blower plenum.

The high pressure airflow and duct distribution system in accordance with this invention can be used in any type of convection oven including, but not limited to, gas-fired convection ovens and electrically-fired convection ovens. Further, the gas-fired convection ovens may use a direct-fired combustion system and/or an indirect-fired combustion system having a heat exchanger.

The convection oven further comprises a gas combustion system mounted with respect to the blower plenum to produce or generate combustion products. In preferred embodiments of this invention, the combustion products move into a heat exchange element comprising a plurality of heat exchange tubes. The heat exchange tubes are mounted within the blower plenum and with respect to the high pressure blower.

As the combustion products move through each heat exchange tube, heat is transferred from within the heat exchange tube to a volume of the blower plenum by conduction. Further, the high pressure blower produces a high pressure airflow across the heat exchange tubes to transfer heat from the heat exchange tubes to the high pressure airflow through convection.

The combustion products collect in a header which is connected to an inducer having an inducer fan that draws or induces the combustion products into the inducer. The inducer has a valve which is moveable between an open position and a closed position. In the open position, the combustion products move through the inducer to ambient air through a vent connected to the inducer. Thus, the combustion products do not enter the duct and the convection oven operates as an indirect-fired combustion system.

In the closed position, the combustion products are in communication with the cooking chamber. Thus, the convection oven operates as a direct-fired combustion system and the combustion products directly contact the food product in the cooking chamber during the cooking process.

BRIEF DESCRIPTION OF THE DRAWINGS

The drawings show different features of a convection oven having a high pressure duct distribution system, according to preferred embodiments of this invention, wherein.

DETAILED DESCRIPTION OF PREFERRED EMBODIMENTS

Figure 1:
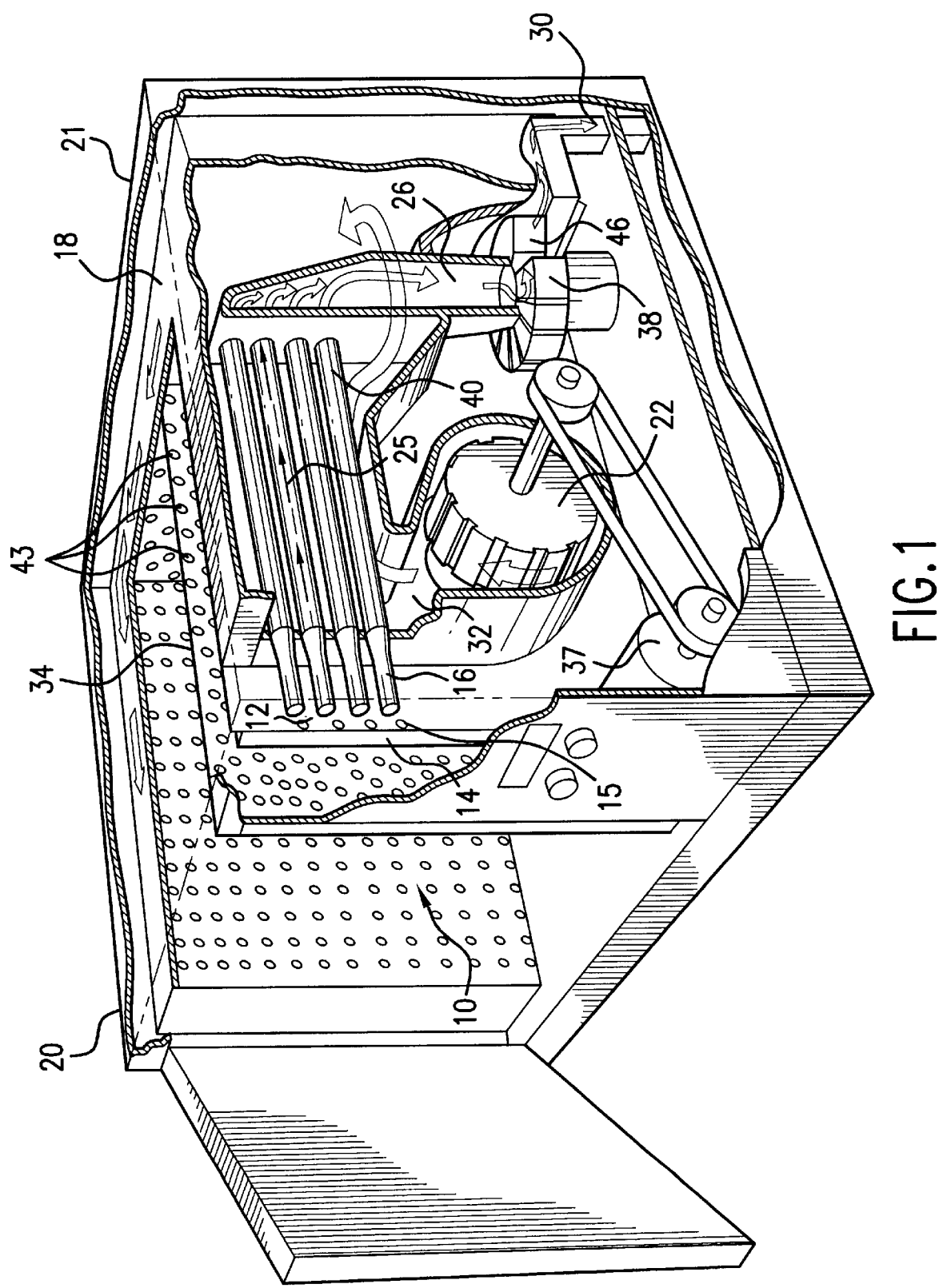
FIG. 1 is a perspective view of the convection oven having a high pressure duct distribution system, according to preferred embodiments of this invention.
Figure 2:
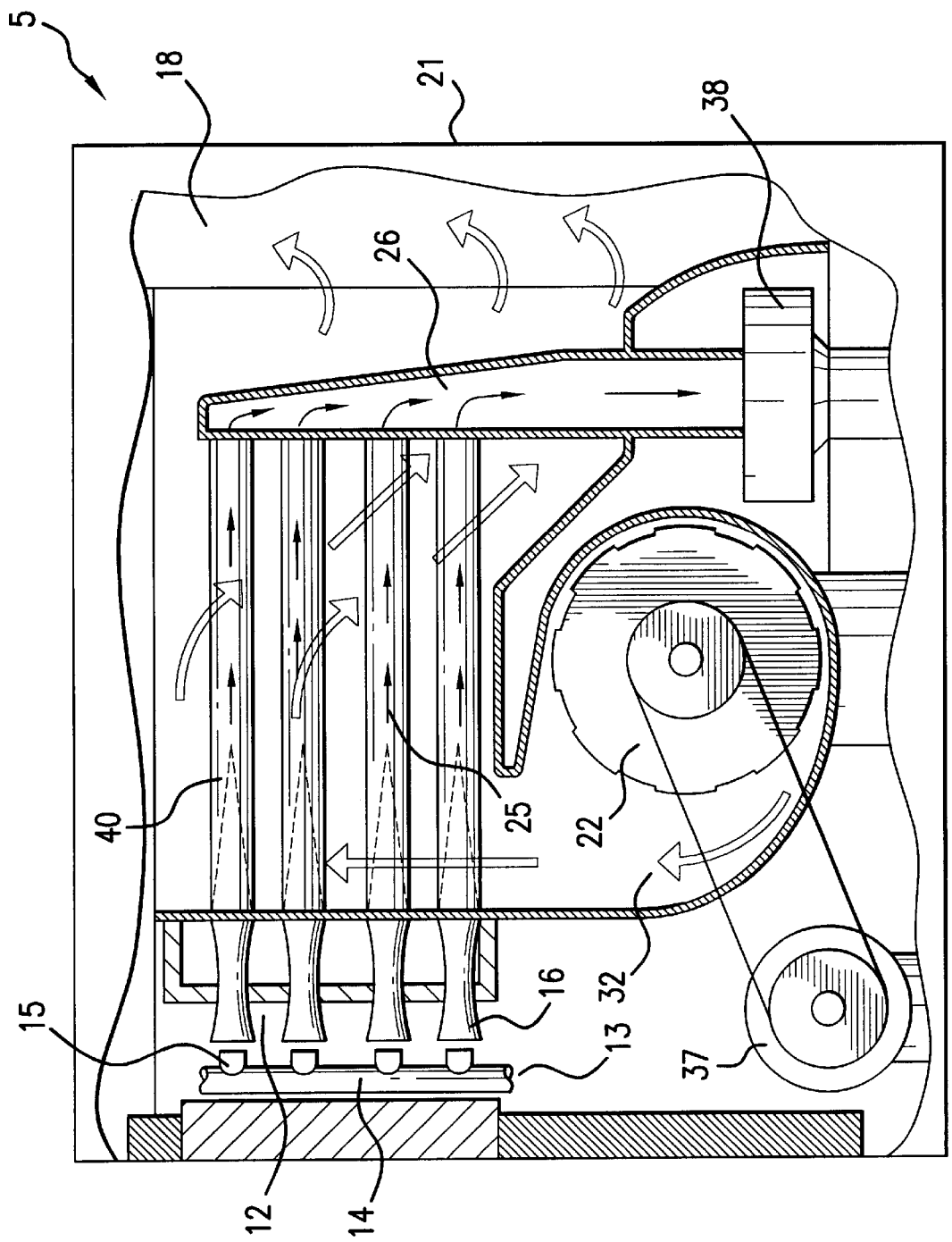
FIG. 2 is a side view of the convection oven showing a high pressure blower and a duct distribution system, according to preferred embodiments of this invention.

Convection oven 5, as shown in FIGS. 1 and 2, may be any type of convection oven including, but not limited to, a gas-fired convection oven or an electrically-fired convection oven. Further, the gas-fired convection oven may use a direct-fired combustion system and/or an indirect-fired combustion system having a heat exchanger. Preferably, but not necessarily, convection oven 5 is a commercial convection oven having a combustion system switchable between a direct-fired combustion system and an indirect-fired combustion system.

Convection oven 5 comprises a cooking chamber 10. Preferably, cooking chamber 10 has at least one rack for supporting a food product during the cooking process. Cooking chamber 10 can have dimensions to accommodate any type, quantity and/or size of food product.

As shown in FIG. 1, a blower plenum 32 is positioned adjacent and in communication with cooking chamber 10. A convection blower 22 is mounted within blower plenum 32. In other preferred embodiments of this invention, a second convection blower is mounted within blower plenum 32.

In one preferred embodiment of this invention, convection blower 22 is a high pressure convection blower having backward inclined fans to produce an airflow of about 800 cubic feet per minute ("cfm") at about 2 inches to about 3 inches of static pressure. It is apparent that convection blower 22 may have any suitable fan configuration known to those having ordinary skill in the art. In another preferred embodiment of this invention, wherein convection oven 5 has cooking chamber 10 having a different volume, the high pressure airflow may vary accordingly. For example, the high pressure airflow may range from about 400 cfm to about 1600 cfm. High pressure blower 22 is driven by a motor 37. In one preferred embodiment of this invention, motor 37 has about ⅛ horsepower ("hp") to about 1 hp, preferably about ¾ hp. It is apparent to those skilled in the art that any reversible motor with suitable hp may be used. It is also apparent to those skilled in the art that other means may be used to drive high pressure blower 22 to produce the required airflow for this invention.

Figure 3:
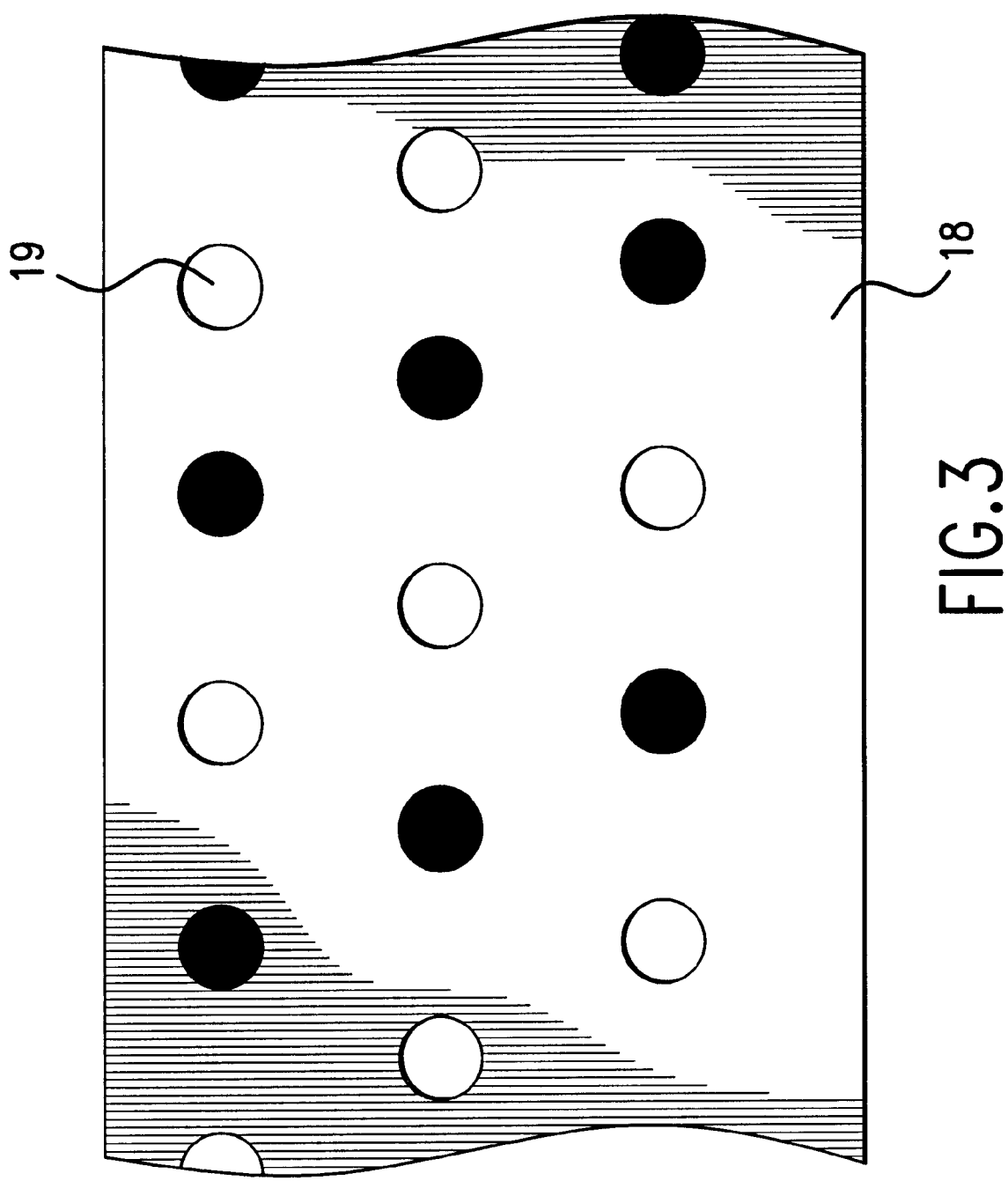
FIG. 3 is a schematic view of a plurality of nozzles extending from at least a portion of an inner wall of a duct into a cooking chamber, according to preferred embodiments of this invention.

A duct 18 is connected to blower plenum 32 and in communication with cooking chamber 10, as shown in FIG. 1. In one preferred embodiment of this invention, duct 18 extends along at least a portion of the back wall 21 and/or a side wall 20 of convection oven 5. Preferably, a plurality of nozzles 19 extend from at least a portion of an inner wall of duct 18 into cooking chamber 10, as shown in FIG. 3. In another preferred embodiment of this invention, a plurality of apertures, for example slots, are positioned on at least a portion of duct 18 so that duct 18 is in communication with cooking chamber 10.

Nozzles 19 are moveable between an open position and a closed position to tune the airflow pattern within cooking chamber 10. In order to maintain the desired static pressure or back pressure within duct 18, the total area of openings in duct 18, i.e. the number of nozzles 19 in the open position, should remain constant throughout the tuning process. Thus, the relative static pressure within duct 18 remains high to properly control the airflow pattern into cooking chamber 10. In one preferred embodiment of this invention, nozzles 19 are arranged along duct 18 in a vertical orientation to correspond with the racks within cooking chamber 10, allowing the airflow through nozzles 19 to properly contact the food product.

Preferably, the static pressure within duct 18 is at least 0.5 inch $H_2O$ or at least about 250%, preferably at least about 300% of a theoretical dynamic pressure. The theoretical dynamic pressure is calculated as the product of the cross-sectional area of duct 18 and the airflow rate through duct 18. Energy stored as static pressure is converted to velocity energy when air flows through nozzles 19 into cooking chamber 10.

The relatively high level of static pressure in duct 18 allows the airflow though nozzles 19 into cooking chamber 10 to be precisely tuned to a definite airflow pattern. Tuning the airflow according to this invention involves closing nozzles 19 in areas where the airflow into cooking chamber 10 is too high, resulting in areas of food product that are overcooked, and opening nozzles 19 in areas where the airflow into cooking chamber 10 is too low, resulting in areas of the food product that are undercooked.

Figure 4:
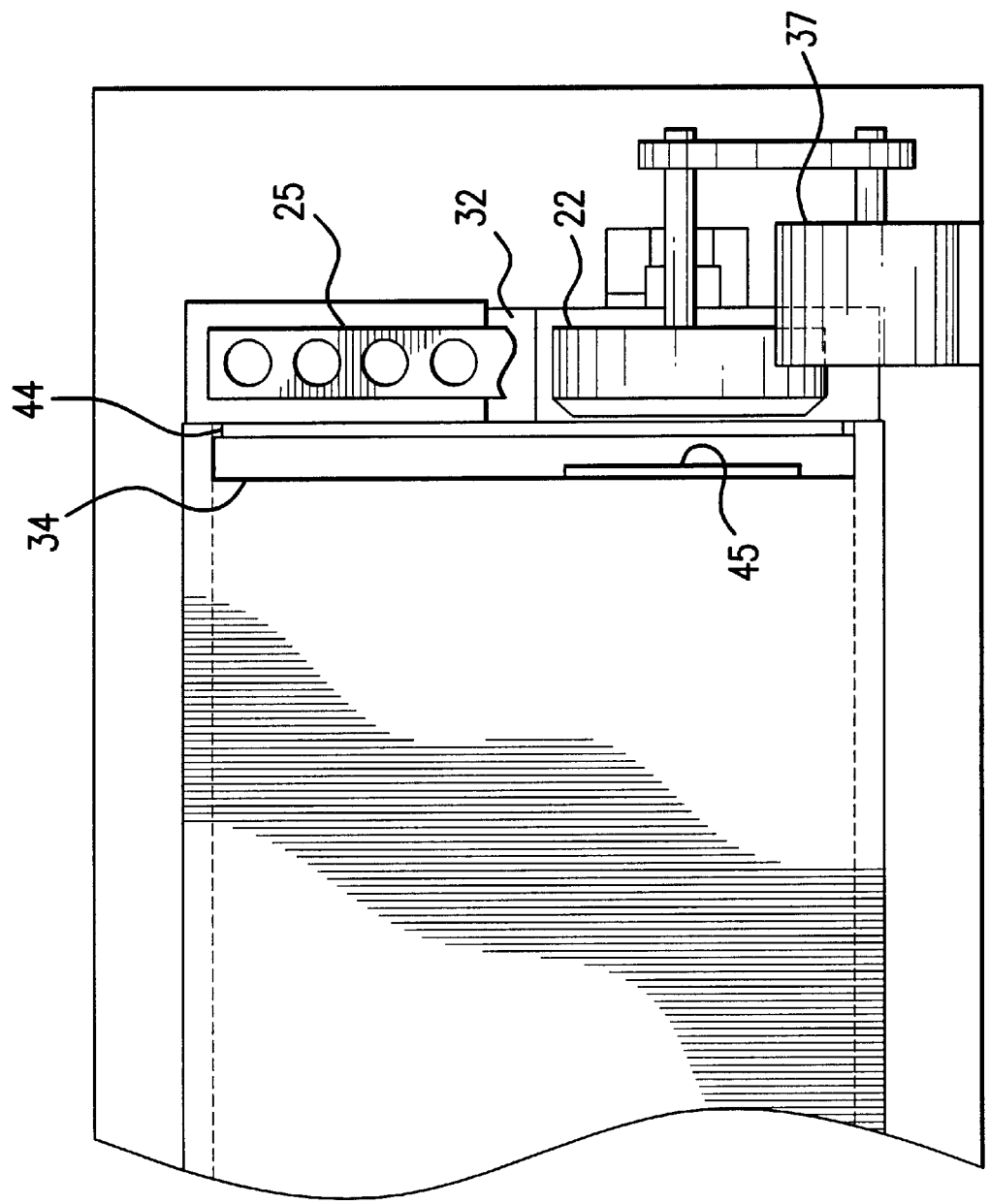
FIG. 4 is a partial frontal view of the convection oven of this invention showing the air returns formed by the inlet baffle and the blower plenum in accordance with embodiments of this invention.

In one preferred embodiment of this invention, an inlet baffle 34 is positioned between cooking chamber 10 and blower plenum 32, as shown in FIG. 1. Inlet baffle 34 has a plurality of apertures 43 to provide communication between cooking chamber 10 and blower plenum 32. Preferably, but not necessarily, inlet baffle 34 has at least one air return 45 (shown in FIG. 4) that corresponds with the positioning of high pressure convection blower 22 within blower plenum 32. In other preferred embodiments of this invention, blower plenum 32 has at least one air return 44 as shown in FIG. 4.

As discussed above, convection oven 5 may be any type of convection oven including, but not limited to, a gas-fired convection oven or an electrically-fired convection oven. In one preferred embodiment of this invention, convection oven 5 further comprises a gas combustion system 12 mounted with respect to blower plenum 32, as shown in FIGS. 1 and 2. Gas combustion system 12 produces or generates combustion products. The term "combustion products" as used throughout this specification and in the claims includes, but is not limited to, heat and combustion gas fumes.

Gas combustion system 12 comprises a gas manifold 14 having at least one gas outlet 15, preferably at least three gas outlets 15. A gas supply 13 supplies gas, for example natural gas, to gas manifold 14. As shown in FIGS. 1 and 2, a burner 16 is attached to each gas outlet 15. As gas is distributed through gas outlets 15 and into burners 16, the gas burns or combusts to generate combustion products. The combustion products move into a heat exchange element 25 connected to each burner 16. Heat exchange element 25 is mounted within blower plenum 32 and with respect to high pressure blower 22. Preferably, heat exchange element 25 is mounted adjacent high pressure blower 22 within blower plenum 32.

In the preferred embodiments according to this invention, heat exchange element 25 comprises a plurality of heat exchange tubes 40, as shown in FIGS. 1 and 2. Preferably, each heat exchange tube 40 has an outer diameter of about 0.75 inch. At least one heat exchange tube 40 is preferably connected to each burner 16 of gas combustion system 12. As the combustion products move through each heat exchange tube 40, heat is transferred from within heat exchange tube 40 to a volume of air within blower plenum 32 by conduction through heat exchange tube 40. Further, high pressure blower 22 produces a high pressure airflow across heat exchange tubes 40 to transfer heat from heat exchange tubes 40 to the high pressure airflow through convection.

Heat exchange tubes 40 are connected to a header 26. Header 26 is mounted within blower plenum 32 and in communication with gas combustion system 12. The combustion products are collected from each heat exchange tube 40 in a volume of header 26 and are drawn into an inducer 38 connected to header 26.

A valve 46, positioned within inducer 38, is moveable between an open position and a closed position. In the open position, the combustion products induced into inducer 38 are in communication with the ambient air through a vent 30 connected to inducer 38. Thus, the combustion products do not enter duct 18 and convection oven 5 operates as an indirect-fired combustion system.

In the closed position, the combustion products induced into inducer 38 are in communication with cooking chamber 10. Thus, convection oven 5 operates as a direct-fired combustion system. In a direct-fired combustion system, the combustion products directly contact the food product in cooking chamber 10 during the cooking process.

Referring to FIG. 1, high pressure convection blower 22 pressurizes the air within the distribution duct system which comprises duct 18 and blower plenum 32. High pressure convection blower 22 generates a high pressure airflow across heat exchange element 25. Heat is transferred from heat exchange element 25 to the air flowing through blower plenum 32 by conduction and convection. The heated air is forced into duct 18.

The air within duct 18 is pressurized to a static pressure of at least 0.5 inch $H_2O$, preferably at least 1.0 inch $H_2O$. The specific magnitude of static pressure within duct 18 determines the jet velocity of airflow leaving nozzles 19. Too much static pressure within duct 18 results in airflow with a high velocity that will overcook or burn the food products in cooking chamber 10. Low static pressure within duct 18 results in a weak airflow through cooking chamber 10 and slow cook times. Further, the relatively high level of static pressure compared to the velocity pressure produces airflow through nozzles 19 having a predictable direction and amount.

The airflow forced through nozzles 19 by the back pressure in duct 18 is adjusted or tuned to create a very precise and defined airflow pattern within cooking chamber 10. The tuning process of airflow through cooking chamber 10 consists of closing nozzles 19 in duct 18 corresponding to areas or portions of the food product which appear overcooked and opening nozzles 19 corresponding to areas or portions of the food products which appear undercooked. The number of nozzles 19 in the open position after the tuning process should equal the number of nozzles 19 in the open position before the tuning process in order to maintain the desired static pressure within duct 18.

The air is forced out of cooking chamber 10 through the plurality of apertures 43 in inlet baffle 34 by high pressure convection blower 22. Preferably, high pressure blower 22 induces the air into blower plenum 32 through air return 44 where the air is forced across heat exchange element 25 and recirculated through the duct distribution system.

While in the foregoing specification this invention has been described in relation to certain preferred embodiments, and many details are set forth for purpose of illustration, it will be apparent to those skilled in the art that this invention is susceptible to additional embodiments and that certain of the details described in this specification and in the claims can be varied considerably without departing from the basic principles of this invention.

What is claimed:

1. A convection oven, comprising:

a cooking chamber;

a blower plenum in communication with the cooking chamber;

a duct connected to the blower plenum, at least a portion of the duct having a plurality of nozzles, each nozzle extending into the cooking chamber and having an open condition and a closed condition; and a high pressure blower in communication with the duct mounted within the blower plenum, the high pressure blower configured to pressurize an interior of the duct.

2. The convection oven of claim 1 further comprising an inlet baffle positioned in communication between the cooking chamber and the blower plenum, the inlet baffle having at least one air return.

3. The convection oven of claim 1 further comprising:

a gas combustion system mounted with respect to the blower plenum, the gas combustion system generating combustion products;

a heat exchange element connected to the gas combustion system;

a header connected to the heat exchange element, the header in communication with the gas combustion system; and an inducer connected to the header, the inducer having a valve moveable between a closed position and an open position, in the closed position the combustion products in communication with the cooking chamber, in the open position the combustion products in communication with a vent connected to the inducer.

4. The convection oven of claim 3 wherein the gas combustion system further comprises:

a gas manifold connected to a gas supply, the gas manifold having at least one gas outlet; and a burner connected to each of the at least one gas outlet, the burner connected to the heat exchange element.

5. The convection oven of claim 3 wherein the heat exchange element comprises a plurality of heat exchange tubes, each heat exchange tube having one end portion connected to a burner and a second end portion extending into the header.

6. The convection oven of claim 1 wherein the high pressure blower is backward inclined.

7. The convection oven of claim 1 wherein the high pressure blower produces about 400 cfm to about 1600 cfm at between about 2 inches and about 3 inches of static pressure.

8. The convection oven of claim 1 wherein the high pressure blower produces about 800 cfm at between about 2 inches and about 3 inches of static pressure.

9. The convection oven of claim 1 wherein the number of nozzles in the open position remains constant during the cooking process.

10. The convection oven of claim 1 wherein the nozzles are arranged in a vertical orientation.

11. The convection oven of claim 1 wherein air within the duct is about 1 inch $H_2O$ static pressure.

12. The convection oven of claim 1 wherein a static pressure within the duct is at least 0.5 inch $H_2O$.

13. The convection oven of claim 1 wherein a static pressure within the duct is at least about 250% of a theoretical dynamic pressure.

14. The convection oven of claim 1 wherein a static pressure within the duct is at least about 300% of a theoretical dynamic pressure.

15. The convection oven of claim 1 wherein the high pressure blower is driven by a motor having about ¾ hp.

16. A method for controlling a flow pattern of air within a convection oven having a duct for providing pressurized air to a cooking chamber, comprising the steps of:
 pressurizing the air within the duct;
 moving the pressurized air through the duct with a high pressure blower;
 distributing the pressurized air in a tuneable airflow pattern into a cooking chamber;
 inducing the distributed air from the cooking chamber into a blower plenum with the high pressure blower; and
 recirculating the air.

17. The method of claim 16 wherein the pressurized air is distributed in a tuneable flow pattern into the cooking chamber through a plurality of nozzles, the nozzles moveable between a closed position and an open position.

18. The method of claim 16 further comprising the step of tuning the airflow pattern by moving at least one nozzle of a plurality of nozzles to one of a closed position and an open position.

19. A convection oven, comprising:
 a cooking chamber;
 a duct distribution system connected to the cooking chamber, the duct distribution system having a duct in communication with a blower plenum, the blower plenum having at least one air return;
 a high pressure blower mounted within the blower plenum and with respect to the at least one air return;
 a heat exchange element mounted within the blower plenum and with respect to the high pressure blower;
 a gas combustion system connected to the heat exchange element; and
 an inlet baffle positioned between the cooking chamber and the blower plenum, the inlet baffle having at least one aperture in communication with the blower plenum.

* * * * *